VOLTAGE REGULATION EMPLOYING A TIME BASE MODULATED AMPLIFIER

Filed Feb. 23, 1962 4 Sheets-Sheet 1

Inventor
Wesley K. Waldron
by Paul A. Frank
His Attorney

VOLTAGE REGULATION EMPLOYING A TIME BASE MODULATED AMPLIFIER

Filed Feb. 23, 1962 4 Sheets-Sheet 2

Inventor
Wesley K. Waldron
by
His Attorney

July 6, 1965 W. K. WALDRON 3,193,696

VOLTAGE REGULATION EMPLOYING A TIME BASE MODULATED AMPLIFIER

Filed Feb. 23, 1962 4 Sheets-Sheet 3

Inventor:
Wesley K. Waldron,
by Paul A. Frank
His Attorney

VOLTAGE REGULATION EMPLOYING A TIME BASE MODULATED AMPLIFIER

Filed Feb. 23, 1962 4 Sheets-Sheet 4

Inventor
Wesley K. Waldron
by Paul A. Frank
His Attorney

United States Patent Office 3,193,696
Patented July 6, 1965

3,193,696

VOLTAGE REGULATION EMPLOYING A TIME BASE MODULATED AMPLIFIER

Wesley K. Waldron, Scotia, N.Y., assignor to General Electric Company, a corporation of New York
Filed Feb. 23, 1962, Ser. No. 175,130
10 Claims. (Cl. 307—88.5)

My invention relates to transistor circuits and in particular to a transistor amplifier circuit that may be employed as a direct current amplifier in high power systems.

The transistor as presently developed, is not a high power device. This characteristic effectively limits the power controllable by transistor amplifiers in systems such as a series regulated power supply. This type of system requires the regulating element be capable of self-dissipating a minimum of 25 to 30% of the output power due to normal ±10% excursions in the supply voltage and, in addition, in the case of a direct current power supply, the amplifier must be a good direct current amplifier if an accurately regulated output is to be maintained. The transistor does not qualify as a control element when considering these factors. It cannot dissipate large amounts of power and is a poor direct current amplifier. Other serious limitations which are inherent in transistors as presently developed are the difficulty in obtaining transistors having component parameters consistently within a desired narrow range of values, and the problem of variation in component parameters with temperature and time. The most important of these component parameters are collector leakage current, base-emitter junction voltage, and gain. To overcome some of these limitations in the past, careful selection of components has been necessary as well as the use of temperature compensating networks.

Therefore, one of the principal objects of this invention is to develop a new and improved transistor amplifier circuit that may be employed to control relatively high power circuits and function as a good direct current or alternating current amplifier.

Another principal object of this invention is to develop a new and improved transistor amplifier circuit that operates independently of variations of component parameters over reasonable limits.

Another object of this invention is to develop a new and improved regulated direct current power supply employing a new transistor amplifier circuit.

In meeting the objects enumerated above, an amplifier circuit is employed which may be described as a time base modulation amplifier. The time base modulation amplifier comprises a transistor operating as a switching amplifier whereby a control signal, generated by another transistor which may aptly be described as a switching generator, causes the switching amplifier to normally operate alternately in its fully conducting and non-conducting states. The switching generator compares a reference voltage and the output voltage of the switching amplifier, and then causes the switching amplifier to assume its fully conducting or non-conducting states according to the relationship of these two voltages. The change in operating states of the switching amplifier between fully conducting to non-conducting conditions is made by utilizing the reference voltage as an intermittent reference voltage, obtained by reducing the effect of the reference voltage to zero for short durations of time. The frequency response of the switching amplifier is such that the switching amplifier does not respond to zeroing of the reference voltage for short time periods and therefore the switching amplifier remains in a fully conducting state at all times except when the output voltage of the switching amplifier increases sufficiently to become greater than the reference voltage. The reference voltage may be a direct current voltage or alternating current voltage thereby permitting the transistor amplifier to be either a direct current or alternating current amplifier. Operation of a transistor in its fully conducting and non-conducting states represents operation at low power dissipation levels thereby permitting application of the transistor to areas of control at power levels wherein normally the transistor could not be used. Further, transistor operation in the fully conducting and non-conducting states reduces the effect of any variation in transistor parameters with temperature and time to a negligible amount. In the operation of a conventional regulated power supply, the error signal between the output load voltage and reference voltage is continuously amplified thereby continuously effecting the proper conduction of the control element to maintain the desired output voltage. This conventional regulation may be described as amplitude modulation whereas the present invention incorporates a means to provide a non-continuous or switching error signal and is aptly described as time base modulation.

The features which I desire to protect herein are pointed out with particularity in the appended claims. The invention itself together with further objects and advantages thereof may best be understood by reference to the following description taken in connection with the accompanying drawings, wherein like parts in each of the several figures are identified by the same reference character, and wherein:

The concept of time base modulation, illustrated by means of simplified circuitry, will first be described. Then the application of this concept of operation as applied to a regulated direct current power supply and other electrical systems will be illustrated.

Figure 1:
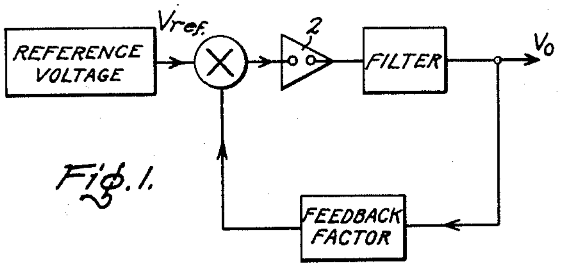
FIGURE 1 is a block diagram of a conventional regulated power supply employing a normal linear amplifier.
Figure 2:
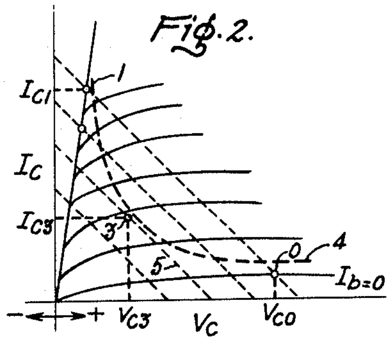
FIGURE 2 is a graphical representation of the linear and switching mode operation of a two-junction grounded emitter transistor.

A conventional series regulated power supply illustrated in FIGURE 1 in block diagram form, requires that the regulating element 2, a conventional linear amplifier, be capable of self-dissipating an amount of power greater than that for which present transistors are designed when the output power rating of the power supply is greater than approximately 1000 watts. This factor effectively limits the employment of transistors in controlling larger amounts of power. However, the transistor has a characteristics which leads to bypassing this difficulty. FIGURE 2 illustrates collector characteristics of a two-junction grounded emitter transistor with base current $I_b$, as a parameter. The parallel dashed straight lines intersecting the collector current axis, $I_c$, and the collector-emitter voltage axis $V_c$, represent load lines of a single resistance at various collector supply voltages. Operation of a transistor as a linear or class A amplifier is conventionally required to attain an output which is a good reproduction of the input reference signal. Class A operation necessitates small signal operation about a point approximately half way along a load line, as point 3. Due to the small signal operation, a continuously conducting class A amplifier must operate below the maximum power dissipation locus, indicated on FIGURE 2 as the heavy dashed hyperbolic line 4, to prevent thermal damage to the transistor. This in effect necessitates operation below the second lowest collector supply voltage load line 5. Since the maximum power output without distortion of a class A amplifier is $$P=\frac{V_{c0}I_{c1}}{2}$$

wherein operating point $V_{c3}$, $I_{c3}$, is indicated on FIGURE 2, it can be seen that this amount of power is very limited.

It is to be noted that operation of the transistor at any point along either the $I_b=0$ or the saturation resistance line (the straight line portion below the knee of the characteristic curves), represents points of low power dissipation in the transistor since these points are below the maximum power dissipation locus 4. Sufficient base current $I_b$, must be supplied to ensure that the desired operating point on the saturation resistance line is reached. Therefore, if the operating point of the transistor can be switched along a load line from point 0 on the $I_b=0$ line to point 1 on the saturation resistance line and vice versa, and this switching can be done rapidly and at a controllable sequence, the average current flow through the transistor may be controlled thereby controlling the average load or output power. Under these conditions the operating point is permitted to transiently pass through the high power dissipation region since excessive peak power dissipation may be tolerated for a few microseconds. The maximum power output obtainable by this switching mode operation should be $$P=\frac{V_{c0}I_{c1}}{2}$$

wherein $V_{c0}$ is the maximum allowable collector to emitter voltage, and $I_{c1}$ is the maximum allowable collector current. This value, however, should be reduced slightly since a realistic evaluation must consider switching rate, ambient temperature, heat sink design, etc. The efficiency and usefulness of this switching mode operation is, however, a considerable improvement over the normal linear operation of the component when considering the maximum power deliverable to the load.

Figure 3:
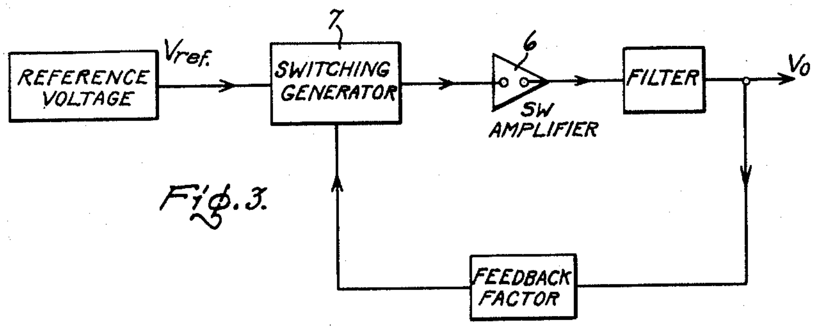
FIGURE 3 is a block diagram illustrating a regulated power supply employing the time base modulation amplifier of the present invention.

The time base modulation amplifier makes use of the switching mode operation of transistors. The concept of switching transistors from point 0 (the non-conducting state) to point 1 (the fully conducting state) is carried throughout the entire amplifier since then the performance of the amplifier may be made quite independent of variations in transistor parameters such as gain, collector leakage current, and supply voltage. The conventional continuously conducting regulating element 2 of the series regulated power supply illustrated in FIGURE 1, is now replaced by a time base modulation amplifier, the non-continuously conducting regulating element of FIGURE 3, comprising a switching amplifier 6 and a switching generator 7. Switching mode operation of the switching amplifier 6 requires the development of a means to produce the switching signal, a switching generator 7. This switching generator must have the ability to compare the output load voltage $V_0$ and reference voltage $V_{ref}$, and then switch the switching amplifier 6 to fully conducting or non-conducting state according to the relationship of these two voltages. The changes from one state to the other should be as fast as possible and the switching generator must be stable over normal line voltage and ambient temperature variations. A non-linear circuit that includes an operating region of negative input impedance will perform the function of a switching generator. In the particular embodiment illustrated herein, a unijunction transistor is employed to develop this switching generator.

Figure 5:
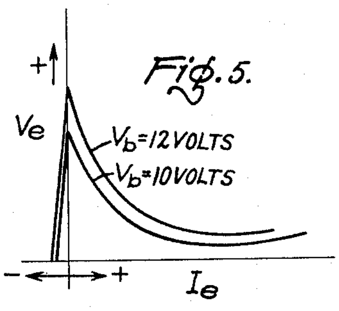
FIGURE 5 is a graphical representation of the unijunction transistor input characteristics with base voltage as a parameter.
Figure 4:
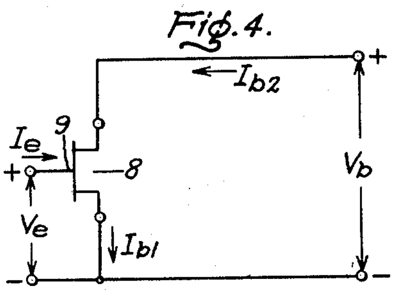
FIGURE 4 illustrates a unijunction transistor with appropriate symbols for the various currents and voltages.
Figure 7:
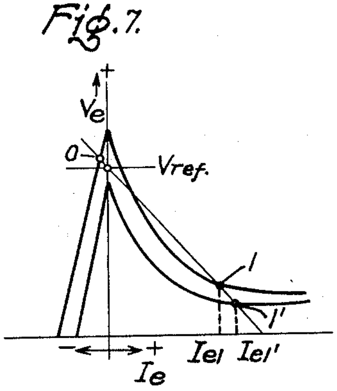
FIGURE 7 is a graphical representation of the operating characteristics of the unijunction transistor circuit of FIGURE 6.
Figure 6:
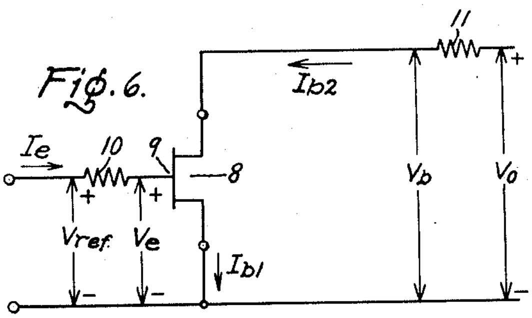
FIGURE 6 illustrates a unijunction transistor circuit comprising external resistors and a fixed reference voltage applied in the emitter electrode circuit.
Figure 8:
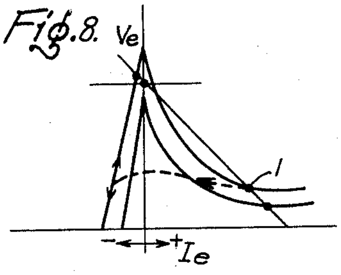
FIGURE 8 illustrates the resulting locus of operation along the input characteristics of the unijunction transistor of FIGURE 6 when the reference voltage is reduced to zero.

The unijunction transistor is a three-terminal semiconductor device comprising one emitter electrode and two base electrodes, and exhibiting electrical characteristics that are quite different from those of a conventional two-junction transistor. The most distinguishing features are an operating region of negative input impedance and a highly stable peak voltage point which permits its application in oscillator circuits, timing circuits and bistable circuits. FIGURE 4 illustrates a unijunction transistor 8 with appropriate symbols for the emitter and base electrode currents and voltages, $I_e$, $I_{b1}$, $I_{b2}$, and $V_e$, $V_b$ respectively. FIGURE 5 illustrates the input characteristics of a unijunction transistor with base electrode voltage as a parameter. It should be noted that the characteristic shifts upward as the base electrode voltage $V_b$ is increased. A variable voltage $V_e$ is shown being applied to the emitter electrode 9 of the unijunction transistor in FIGURE 4. FIGURE 6 illustrates the unijunction transistor of FIGURE 4 but instead of a variable voltage, a fixed reference voltage $V_{ref}$, is employed as a source in the emitter electrode circuit, and the output load voltage to be regulated $V_0$, is also indicated. FIGURE 7 is a graphical representation of the operating characteristics of the unijunction transistor circuit of FIGURE 6. The straight line represents a load line with intercepts on the emitter electrode voltage and current axes being determined by $V_{ref}$ and the emitter external resistor 10. A reference to the higher base electrode voltage curve of FIGURE 7 discloses two stable points of operation along the load line, points 0 and 1. If operation is initially at point 0 and the base electrode voltage $V_b$ decreases due to a decrease in the output load voltage $V_0$, then the condition of the lower curve exists, operation switches to point 1′, the only stable point on the load line, an emitter current $I_{e1}'$ flows through resistor 10 and represents an input signal which effects full conduction of a switching amplifier subsequently coupled to this switching generator. The conduction of the switching amplifier causes the output load voltage $V_0$ to increase, and this voltage is fed back to the switching generator by means of resistor 11 thereby increasing voltage $V_b$ to the initial higher base electrode voltage and operation reverts to point 1 on the unijunction input characteristic curve. Unfortunately the resulting change in emitter current $I_e$ from $I_{e1}'$ to $I_{e1}$ does not effect nonconduction of the switching amplifier and a suitable means to accomplish this function is required. This function may be accomplished by reducing the reference voltage $V_{ref}$ to zero for short periods of time. The effect is illustrated in FIGURE 8. If operation is at point 1 and the reference voltage drops to zero, the locii of operating points roughly follows the dashed path indicated, reducing the emitter current $I_e$ to zero. The reference voltage is then reapplied, and a readout is quickly made by comparing the reference voltage to the peak voltage of the unijunction input characteristic that exists at that instant due to $V_b$ and hence the magnitude of the output load voltage $V_0$. If the reference voltage continues to be larger than the peak voltage, operation quickly switches to a new point 1″ (not shown), where new point 1″ is probably located between points 1 and 1′ illustrated in FIGURE 7, and on a base electrode voltage line located between the two base electrode voltage lines illustrated, the switching amplifier remains in its fully conducting state, and the output load voltage $V_0$ continues to increase. On the next or a subsequent cycle following the zeroing of the reference voltage, the peak voltage may be larger than the reference voltage and the point of operation reverts to point 0. At this point, the unijunction emitter current $I_e$ is zero or slightly negative and the switching amplifier switches to the nonconducting state. The output load voltage then slowly decreases due to a capacitor discharge in the output load circuit to be subsequently described, and at some later time the reference voltage will again be larger than the peak voltage as established by $V_b$ and the switching amplifier will again switch to its fully conducting state.

Figure 9:
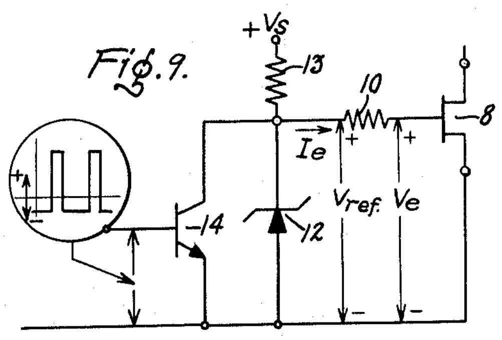
FIGURE 9 illustrates a unijunction input circuit including means to reduce the reference voltage to zero.

Effective zeroing of the reference voltage may be accomplished by introducing reset pulses of voltage to an appropriate circuit that is coupled in some manner to the reference voltage. The reset pulse frequency is not critical, the miniumum frequency being limited by the desired performance of the system, and the maximum by characteristics of the components merely as an example and not by way of limitation, the reset pulse frequency may be 15 to 20 kilocycles per second and the reset pulse width in the order of 10 microseconds. FIGURE 9 illustrates a circuit which accomplishes the reference voltage zeroing effect. The voltage across zener diode 12, as determined by the supply voltage $V_s$ and resistor 13, is the reference voltage $V_{ref}$. Reset pulses are introduced to the base electrode circuit of transistor 14 effecting full conduction of this transistor, thus short circuiting the reference during the interval of the reset pulse. The frequency response of the switching amplifier is such that the effect of the reset pulse is greatly attenuated and the switching amplifier remains essentially fully conducting at all times except when the output voltage creates a condition where the reference voltage is less than the peak voltage of the switching generator. It is to be noted that the switching mode operation of the switching amplifier is strictly a random sequence and will depend on the values of line voltage, load impedance and voltage, and the reset pulse. The reset pulse may be established by any conventional means.

It can be appreciated that the time base modulation amplifier contains the embodiment of a sampled data system in that the output voltage is compared to a reference voltage at discrete intervals of time in the switching generator circuit, whereas it also contains the embodiment of a relay type servo system in that as soon as the output voltage becomes less than the reference voltage, the switching amplifier is caused to fully conduct except if this output voltage decrease should occur during the very brief time interval of a reset pulse's existence. In that event the switching amplifier becomes fully conducting at the termination of that reset pulse, and in either event will remain fully conducting for the remaining time interval that the low output voltage condition exists regardless of the time phase position of subsequent reset pulses.

The overall system functions as a direct current amplifier when a fixed reference voltage $V_{ref}$ is utilized. Adding an alternating current signal as another input to the switching generator, and insuring that the reset pulse will provide effective zeroing of the sum of the fixed reference voltage and the alternating current signal, converts the over-all system into an alternating current amplifier.

Figure 10:
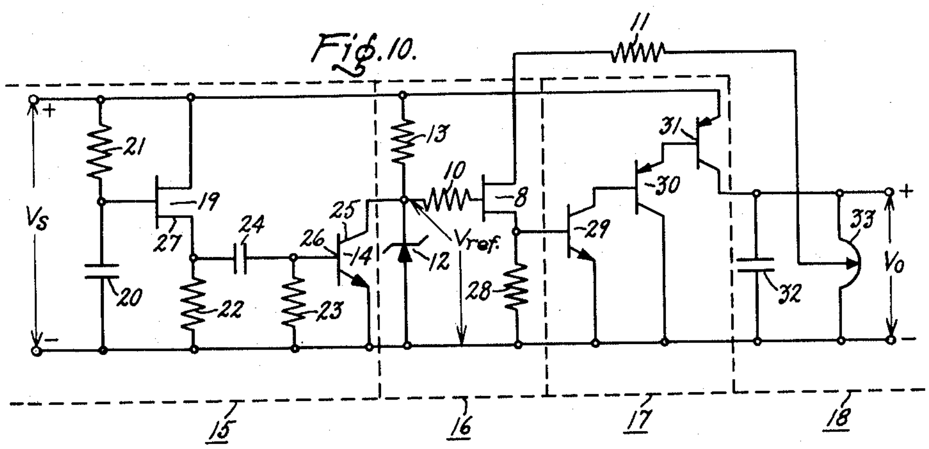
FIGURE 10 is a simplified circuit diagram of a regulated power supply employing a time base modulation amplifier.

A regulated direct current power supply is one of many possible system that may employ a time base modulation amplifier. FIGURE 10 illustrates a simplified diagram of such a power supply. The power supply can be divided into several circuits, each designated as a whole by a numeral as the reset oscillator and amplifier 15, the switching generator and reference 16, the switching amplifier 17, and the filter and feedback network 18. The reset oscillator and amplifier 15 are both conventional circuits, the oscillator developing a sawtooth waveform output voltage at the reset pulse frequency. The oscillator comprises a unijunction transistor 19 and a timing circuit including capacitor 20 and resistors 21 and 22. The sawtooth voltage may conveniently have a rise time to decay time ratio of 4 to 1. The rise time is determined by the charging of capacitor 20 from the supply voltage $V_s$ through resistor 21. The decay time is determined by the discharge of capacitor 20 through unijunction transistor 19 and resistor 22. The output voltage of unijunction transistor 19 is differentiated by a series circuit comprising resistor 23 and capacitor 24, thereby converting the oscillator sawtooth output voltage to a series of pulses similar to the transistor 14 input signal illustrated in FIGURE 9 (actual slope of horizontal portions of the pulse train have been omitted). This pulse signal is large enough in magnitude to insure complete saturation of a reset pulse amplifier, comprising a conventional two-junction transistor 14 as also illustrated in FIGURE 9, during its conducting condition and still furnishes complete cutoff during its non-conducting condition, due to the negative portion of the pulse train. Collector electrode 25 is maintained at the reference voltage of zener diode 12 during its non-conducting condition. The effect of any change in the collector leakage current of transistor 14 is minimized by a bias voltage of reversed polarity being applied to the base-emitter electrode circuit of transistor 14 when capacitor 24 discharges through resistors 23 and 22 during the interval between reset pulses, thereby effecting non-conduction of this transistor when the reset pulse signal is absent, and also by the inherent operation of this transistor whereby it is either in the fully conducting or non-conducting state. Resistor 23 also functions to provide a path for the collector leakage current of transistor 14, thereby minimizing its absolute value. Capacitor 24 isolates base electrode 26 from any direct current voltage existing on the second base electrode 27 of unijunction transistor 19.

The switching generator and reference circuit 16 includes the unijunction transistor and zener diode circuit of FIGURE 9. The input signals to the unijunction transistor 8 are derived from a feedback of regulator output voltage $V_0$, the reference voltage $V_{ref}$ across zener diode 12, and the reset pulses to reset pulse amplifier 14. The principles by which this circuit performs as a switching generator have been explained previously in describing FIGURES 6 and 9. Zener diode 12 may be expected to maintain at least a 1% accuracy in light of a $\pm 10\%$ variation in supply voltage $V_s$. Output of the switching generator is developed across load resistor 28.

Switching amplifier 17 may utilize a direct coupled transistor amplifier employing transistors 29, 30 and 31. Each of these three transistors operates in the switching mode, either fully conducting or non-conducting as determined by the relation of the regulator output voltage $V_0$ to the reference voltage $V_{ref}$. Due to the frequency response of the switching amplifier, the output voltage is not sensitive to the short duration reset pulses. Also, if the switching amplifier is initially in a non-conducting state, it cannot be switched to a conducting state during the interval a reset pulse exists since at that time the unijunction transistor 8 cannot be switched to its conducting state, regardless of the magnitude of the regulator output voltage $V_0$.

Filter and feedback network 18 comprises a filter capacitor 32 employed in the output stage of transistor 31 to minimize any transient effects which may exist at this point. During intervals when the switching amplifier is non-conducting, capacitor 32 slowly discharges through potentiometer 33 thereby reducing the regulator output voltage $V_0$. Therefore there is a two-way regulation of the output voltage; when it is too low, the switching amplifier conducts to effect an increase in the voltage, and when it is too high, the capacitor discharges to decrease the voltage. The feedback signal to the switching generator is developed across potentiometer 33 and fed back by means of resistor 11 which also aids in maintaining the peak voltage point of unijunction transistor 8 independent of temperature.

Figure 11:
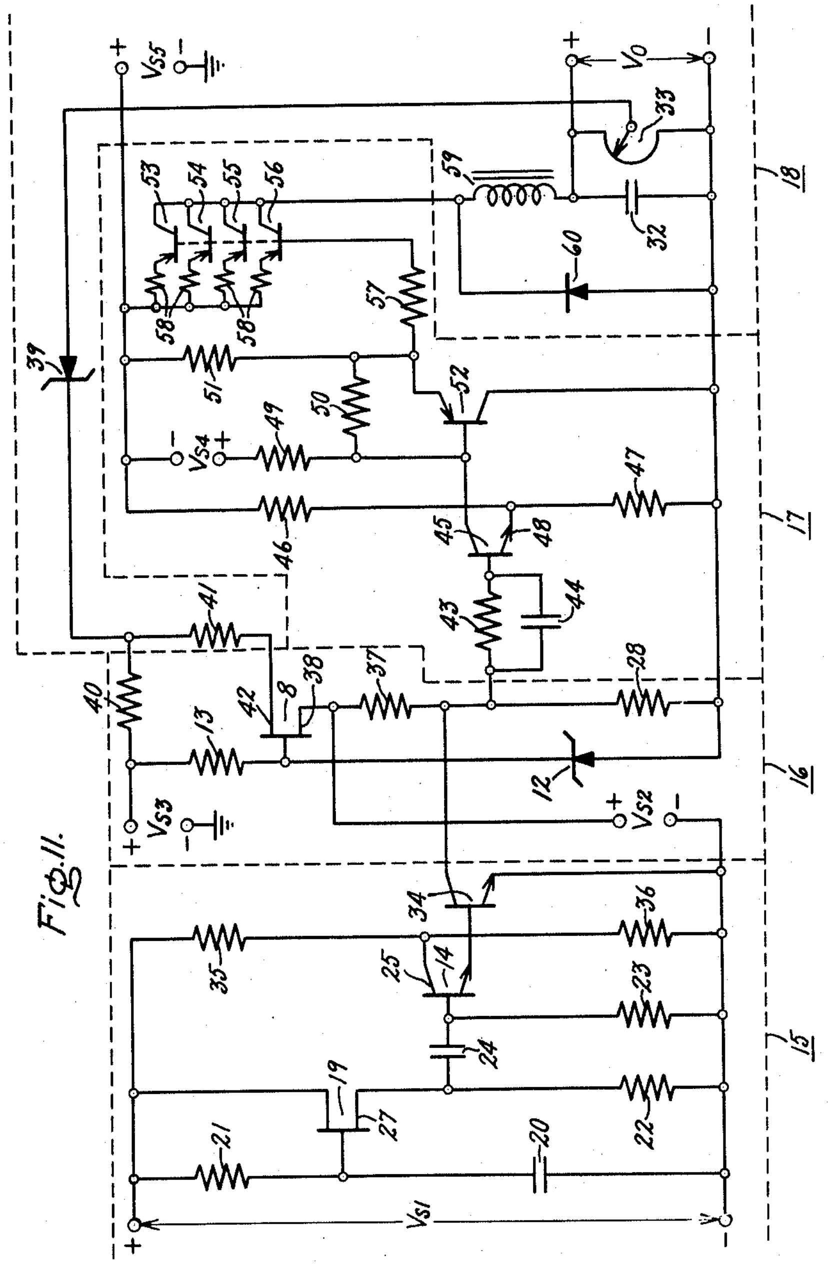
FIGURE 11 is a more detailed circuit diagram of a regulated power supply similar to that of FIGURE 10.

FIGURE 11 illustrates a more detailed and slightly modified circuit of the regulated direct current power supply illustrated in FIGURE 10. A second reset pulse amplifier comprising transistor 34 is employed in the reset oscillator and amplifier circuit 15. Resistors 35 and 36 form a voltage divider network across the reset oscillator and amplifier circuit supply voltage $V_{s1}$ to produce the desired voltage at the collector electrode 25 of the first reset pulse amplifier 14.

The switching generator and reference circuit 16, incorporates several modifications not present in the circuit of FIGURE 10. First, the reset pulse is introduced at a point between load resistor 28 and resistor 37, these resistors being connected between the base electrode 38 of unijunction transistor 8 and the negtaive side of the regulator output voltage. Voltage source $V_{s2}$, connected in series with the emitter and collector electrodes of reset pulse amplifier 34 and resistor 37, assures that unijunction 8 will be non-conducting when reset pulse amplifier 34 conducts, by biasing base electrode 38 with a positive voltage.

If the regulator output voltage $V_0$ is desired to be maintained at a low voltage, a difficult problem of obtaining an adequate reference voltage component, the zener diode 12 exists from the standpoint of reference components available. A diode which exhibits the required low voltage reference is inadequate due to its high dynamic impedance and its sensitivity to temperature. This problem is solved by employing a zener diode 39 which may be the same type as zener diode 12 in the feedback circuit, connected to potentiometer 33. These two zener diodes 12 and 39 offer improved performance since it may be assumed they are each affected equally by external causes. The regulator now functions to maintain the sum of the regulator output voltage and the feedback zener diode voltage as a constant, wherein the zener diode voltage is greater than the regulator output voltage. Resistors 13 and 40, connected to voltage source $V_{s3}$, act to bias zener diodes 12 and 39 respectively in their low impedance region. Resistor 41, connected in the feedback circuit between zener diode 39 and base electrode 42 of unijunction transistor 8, aids to maintain the peak voltage point of this transistor independent of temperature.

The switching amplifier 17 employs a resistor-capacitor network, 43, 44, in the base electrode circuit of the first transistor 45, to reduce the switching time. A bias voltage of reversed polarity is applied to each amplifier stage to further reduce the switching time, reduce the effect of collector leakage current amplification, and allow for an increase in transistor collector to emitter voltage rating when desired. Resistors 46, 47 connected to the emitter electrode 48 of transistor 45 provide a negative bias on this transistor to overcome the voltage drop across resistor 28 when unijunction transistor 8 is not conducting, to thereby maintain transistor 45 in the non-conducting state. Resistors 49, 50, 51, connected across voltage sources $V_{s4}$, provide a bias voltage of reversed polarity to transistors 52, 53, 54, 55, 56 to maintain them in a non-conducting state when the regulator output voltage is greater than the reference voltage. A current limit resistor 57 is connected between the emitter electrode of transistor 52 and the base electrodes of transistors 53, 54, 55, 56, connected in parallel to form a power amplifier or output stage. A resistor 58 is preferably connected in the emitter electrode circuit of each of these parallel connected transistors to permit each transistor to share the load current equally. Voltage source $V_{s5}$ supplies power to the power amplifier.

Filter and feedback network 18 requires a large capacitor 32 to smooth out transient effects since the output stage is frequently switched between its conducting and non-conducting states. The inherent low resistance of this large capacitor would reflect any incremental currents occurring in the capacitor due to the amplifier switching action as changes in the voltage across the capacitor and hence the regulator output voltage. However inductor 59, connected in series with capacitor 32 and transistors 53, 54, 55, 56, reduces the magnitude of current variations in the capacitor and further reduces any effect of the reset pulse frequency that may be present in the output stage. Diode 60, connected in parallel with the series network of capacitor 32 and inductor 59, provides a flow path for the inductive current when the power amplifier 53, 54, 55, 56 switches to a non-conducting state.

Figure 12:
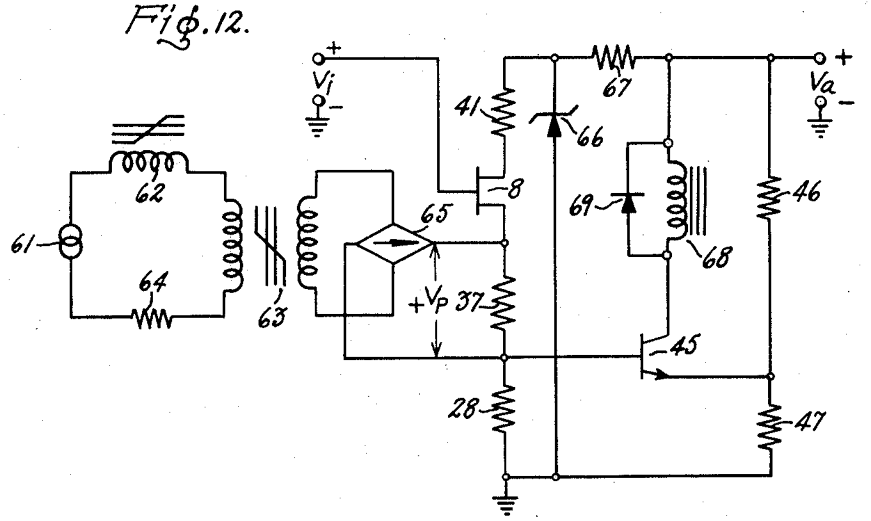
FIGURE 12 is a circuit diagram illustrating a zero deadband relay control employing a time base modulation circuit.

FIGURE 12 illustrates the application of the time base modulation principle to a zero deadband relay control circuit. Alternating current voltage source 61, in series with saturating reactor 62, primary winding of saturating transformer 63, and current limiting resistor 64, form a pulse generator circuit. The output of the pulse generator circuit is rectified by full-wave rectifier 65 to provide single polarity short time duration reset pulses $+V_p$, across resistor 37 in a unijunction transistor base electrode circuit, thereby effecting non-conduction of the unijunction transistor during the interval of the reset pulse. Resistors 28 and 41 in the unijunction transistor base circuits serve the same function as the corresponding resistors in FIGURE 11. Zener diode 66, connected in the base electrode circuit of unijunction transistor 8, functions as a voltage regulator to maintain a constant voltage across the two points to which it is connected. Series dropping resistor 67 is connected from one end of zener diode 66 to a direct current voltage source $V_a$. The output of unijunction transistor 8, developed across resistor 28, is coupled to a transistor amplifier 45 wherein resistors 46 and 47 provide the necessary bias voltage to maintain this transistor in a non-conducting condition when unijunction transistor 8 is non-conducting. Relay coil 68 of the relay to be controlled is connected in the collector circuit of transistor 45. The zero deadband relay control operates in the following manner:

The reset pulses $+V_p$, obtained from the saturating cores occur at a 120 cycle per second rate when the frequency of alternating current voltage source 61 is 60 cycles per second. The reset pulses are sufficient in magnitude to cause unijunction transistor 8 to become non-conducting regardless of the presence of a signal voltage $V_1$ at the emitter of the unijunction transistor. When voltage $V_1$ is applied to the emitter electrode of unijunction transistor 8, and is greater in magnitude than the peak voltage of the unijunction transistor, the unijunction transistor switches to a fully conducting state during the interval of time when no reset pulse is present. The reset pulse in turn switches the unijunction transistor to a non-conducting state. Amplifier 45 functions as a switching amplifier and becomes conducting and non-conducting in the same sequence as does unijunction transistor 8 since the 120 cycle per second reset pulse frequency is not attenuated to any great extent by the frequency response of the amplifier. However, the short time duration of the reset pulses prevents the relay from following this transient condition. Relay coil 68 therefore remains energized whenever voltage $V_1$ is greater than the peak voltage of unijunction transistor and remains de-energized whenever voltage $V_1$ is less than the peak voltage. A diode 69 may be placed in parallel with relay coil 68 to protect transistor 45 from damage due to the 120 cycle per second rate switching actions and to further insure that the relay does not sense the reset switching action of transistor 45. The zero deadband relay control overcomes the problem of the pickup and dropout voltage differential that exists in relays and also overcomes the problem of any variation in the pickup or dropout voltage which problems may be quite objectionable in certain applications.

Figure 13:
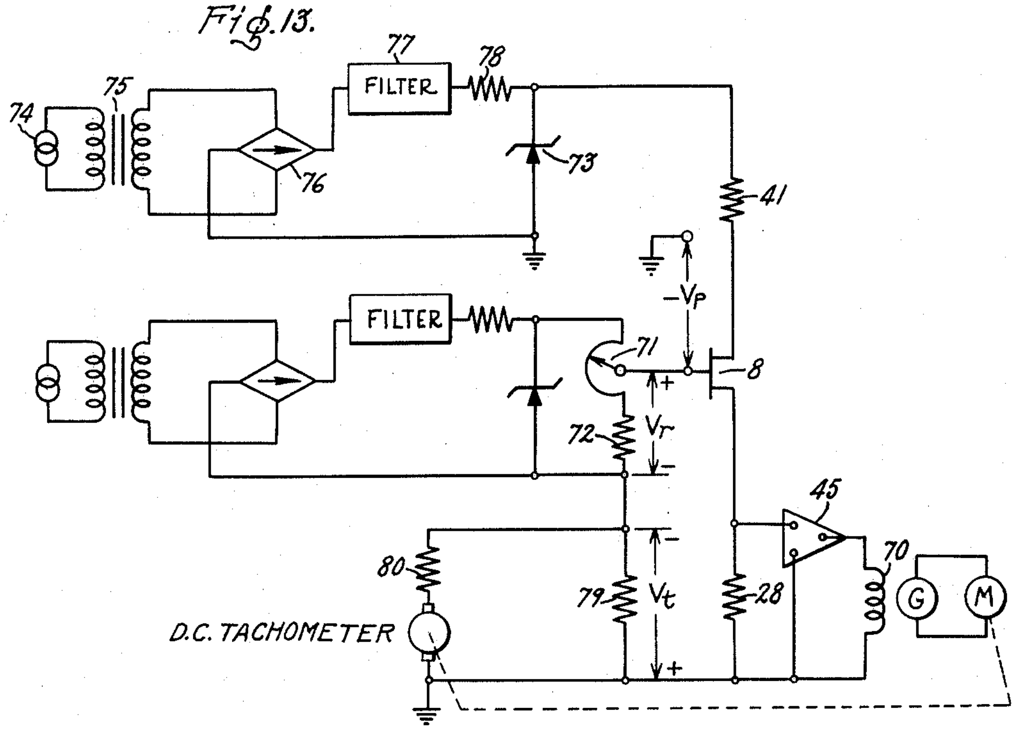
FIGURE 13 is a circuit diagram illustrating a motor speed control system employing a time base modulation amplifier circuit.

FIGURE 13 illustrates a motor speed control employing a time base modulation amplifier. A speed control whereby the speed of a motor is to remain at some fixed level may be produced in the same manner as the regulated power supply of FIGURE 11. However, variable speed controls require a slightly different approach in order to maintain a constant amplitude input signal to the switching amplifier over all motor speeds. The problem is resolved as shown in FIGURE 13. A speed reference voltage $V_r$ is reduced by a motor driven tachometer voltage $V_t$ wherein $V_r$ is always greater than $V_t$ and the system operates to maintain a constant difference voltage $(V_r-V_t)$. When this voltage difference is greater than the unijunction transistor peak voltage point, switching amplifier 45 switches into a fully conducting state thereby energizing a generator field circuit 70 and increasing the motor speed. A reset pulse source $-V_p$, which may be developed from a similar circuit as obtains $+V_p$ in FIGURE 12, but of opposite polarity, is connected to the emitter electrode of unijunction transsistor 8 and causes the unijunction transistor to switch from a conducting to a non-conducting state. However, this reset pulse is not sensed by the switching amplifier 45 due to its frequency response, and the amplifier assumes its conducting or non-conducting states in accordance with the relation of the voltage difference $(V_r-V_t)$ to the unijunction transistor peak voltage point. When the speed reference potentiometer 71 is set at a minimum, the voltage across the fixed resistor 72 is slightly greater than the peak voltage point of the unijunction transistor as established by a voltage regulator zener diode 73. Zener diode 73 is supplied by a voltage from a circuit comprising an alternating current voltage source 74, a transformer 75, full-wave rectifier 76, filter network 77, and series dropping resistor 78. The voltage circuit for speed reference potentiometer 71 is obtained from a like circuit as illustrated.

When starting the motor from rest, there may be some objection to applying full power to the motor. Such procedure may result in shearing of gears, destruction of material being driven, etc. As a remedy it may be advisable to insert a small 60 cycle per second voltage $V_{ac}$ in series with speed reference voltage $V_r$. Voltage $V_{ac}$ will reduce the time during which switching amplifier 45 is fully conducting and reduce the average power output, but will still maintain speed regulation. The voltage $V_{ac}$ may be programmed to zero as the speed control potentiometer 71 is advanced for higher speeds. The accuracy of the motor speed control circuit is established at the time of comparison of $(V_r-V_t)$ and the peak voltage point at which time the unijunction transistor is not conducting. Resistors 28 and 41 serve the same function as the corresponding resistors in the regulator circuit of FIGURE 11. Tachometer voltage $V_t$ is developed across resistor 79 and the element illustrated as resistor 80 may be a filter or stabilizing network rather than a pure resistor.

The motor speed control may be simplified by eliminating the speed reference circuit comprised of resistors 71, 72 and the supply voltage circuit across these two resistors, reversing the polarity of tachometer voltage $V_t$, replacing resistor 79 by potentiometer 71 to obtain variable speed control, and providing a phase reversal in the amplifier.

While the present invention has been described by reference to particular embodiments thereof, it is believed obvious that other embodiments, modifications, and variations of the invention are possible in light of the above teachings. For example, the switching generator may employ a two-junction transistor circuit as in the conventional Schmitt trigger circuit, or a tunnel diode circuit, each of these being non-linear operating circuits that include an operating region of negative input impedance. Also in the switching generator, the position of the input signals from reference voltage and feedback voltage may be interchanged. Although the embodiments herein disclose the time base modulation amplifier as a direct current amplifier, it may be employed as an alternating current amplifier by adding an alternating current signal to be amplified as an input signal to the switching generator. It is, therefore, to be understood that changes may be made in the particular embodiments of the invention described which are within the full intended scope of the invention as defined by the following claims.

What I claim as new and desire to secure by Letters Patent of the United States is:

1. A time base modulation amplifier circuit comprising an amplifier means normally operating alternately in fully conducting and non-conducting states, means for developing an intermittent reference voltage, switching means connected to an output of said intermittent reference voltage means and an output of said amplifier means for comparing said intermittent reference voltage and output voltage of said amplifier means and adapted to develop a signal dependent on the relationship of the compared voltages, output of said switching means being coupled to an input of said amplifier means, said signal thereby effecting switching operation of said amplifier means from one state to the other.

2. The combination set forth in claim 1 wherein said means for developing an intermittent reference voltage comprises a reference voltage source and a reset pulse voltage source whereby the intermittent reference voltage consists of an output of the reference voltage source effectively reducible to zero for short intervals of time as determined by the width and frequency of reset pulses supplied from the reset pulse voltage source.

3. The combination set forth in claim 2 wherein said amplifier means comprises a transistor amplifier of low power rating, said amplifier normally operating in its fully conducting state when said reference voltage is greater than a peak voltage determined by the output voltage of the transistor amplifier, and said amplifier normally operating in its non-conducting state when said reference voltage is less than said peak voltage, said fully conducting and non-conducting operating states representing low power dissipation levels within said transistor amplifier.

4. The combination set forth in claim 3 wherein said amplifier has a frequency response permitting said amplifier to fail to respond to the reset pulse voltage and to remain in a fully conducting state during a time interval that said switching means detects a consistently low output voltage.

5. The combination set forth in claim 4 wherein said switching means comprises a non-linear circuit that includes an operating region of negative input impedance, said non-linear circuit comparing said intermittent reference voltage and output voltage of said amplifier at the reset pulse frequency and adapted to develop said signal as determined by the compared voltages, said signal effecting rapid switching of said transistor amplifier from one state to the other thereby permitting said transistor amplifier of low power rating to operate within thermal limits in a relatively high power system and to reduce effects of transistor parameters and their variation with temperature and time to a negligible amount.

6. The combination set forth in claim 5 wherein said non-linear circuit comprises a unijunction transistor circuit.

7. The combination set forth in claim 2 wherein said reference voltage source comprises a direct current voltage, whereby the time base modulation amplifier circuit functions as a direct current amplifier.

8. The combination set forth in claim 2 wherein said reference voltage source comprises a direct current voltage and an alternating current voltage, whereby the time base modulation amplifier circuit functions as an alternating current amplifier.

9. A time base modulation amplifier circuit comprising a switching device, a transistor amplifier of low power rating, a reference voltage effectively reducible to zero for short periods of time, input signals to said switching device comprising said reference voltage and output voltage of said amplifier, output of said switching device being determined by the relationship of said input signals and being coupled to an input of said amplifier, said amplifier operating between fully conducting and non-conducting states as determined by said switching device output, thereby permitting said amplifier of low power rating to operate within thermal limits in a relatively high power system.

10. A time base modulation amplifier circuit comprising a source of supply voltage, a two-junction transistor having a base electrode, emitter electrode and collector electrode, said transistor operating as a switching amplifier, a unijunction transistor having an emitter electrode and first and second base electrodes, said unijunction transistor operating as a switching generator, the emitter electrode of said two-junction transistor connected to a terminal of the source of supply voltage, said two-junction transistor being adapted to switch between non-conducting and fully conducting operating states as determined by a signal developed in a circuit including the first base electrode of said unijunction transistor and being coupled to the base electrode of said two-junction transistor, output of said two-junction transistor being coupled from the collector electrode to the second base electrode of said unijunction transistor, a reference voltage being applied to the emitter electrode of said unijunction transistor, said signal developed in the first base electrode circuit of the unijunction transistor being determined by comparison of the reference voltage and the output of said-two junction transistor, and a reset pulse voltage characterized by short duration pulses and being coupled to said unijunction transistor to reduce the effect of said reference voltage to zero for short intervals of time as determined by the short duration of said reset pulses, said reset pulses permitting said two-junction transistor to switch rapidly from its fully conducting to non-conducting state when the output voltage of said two-junction transistor attains a desired level as determined by said reference voltage.

References Cited by the Examiner

IBM Technical Disclosure Bulletin, vol. 2, No. 4, December 1959, pages 77–78 "Combined Reference-Voltage Switch."

ARTHUR GAUSS, *Primary Examiner.*